United States Patent
Romeo

(10) Patent No.: US 9,627,921 B2
(45) Date of Patent: Apr. 18, 2017

(54) SOLAR PARKING MODULE WITH INTEGRATED EV CHARGING STATION

(75) Inventor: Manuel Lahuetra Romeo, Zaragoza (ES)

(73) Assignee: Tempero 2000 S.L. (ES)

( * ) Notice: Subject to any disclaimer, the term of this patent is extended or adjusted under 35 U.S.C. 154(b) by 589 days.

(21) Appl. No.: 14/347,418

(22) PCT Filed: Oct. 17, 2011

(86) PCT No.: PCT/ES2011/000300
§ 371 (c)(1),
(2), (4) Date: Mar. 26, 2014

(87) PCT Pub. No.: WO2013/057325
PCT Pub. Date: Apr. 25, 2013

(65) Prior Publication Data
US 2014/0246903 A1 Sep. 4, 2014

(51) Int. Cl.
*H02J 7/00* (2006.01)
*H02J 7/35* (2006.01)
(Continued)

(52) U.S. Cl.
CPC .......... *H02J 7/355* (2013.01); *B60L 11/1816* (2013.01); *B60L 11/1824* (2013.01);
(Continued)

(58) Field of Classification Search
USPC .......................................... 307/66
See application file for complete search history.

(56) References Cited

U.S. PATENT DOCUMENTS

| 2011/0079214 A1* | 4/2011 | Hon | F24J 2/542 126/573 |
| 2012/0291374 A1* | 11/2012 | Zante | F24J 2/5232 52/173.3 |

FOREIGN PATENT DOCUMENTS

DE  102009039884  3/2011
EP  1933389  6/2008
(Continued)

OTHER PUBLICATIONS

International Search Report in PCT Application PCT/ES2011/000300, Oficina Espanola De Patentes Y Marcas, May 7, 2012.

*Primary Examiner* — Rexford Barnie
*Assistant Examiner* — Dru Parries

(57) ABSTRACT

Solar parking module with integrated Electric Vehicle charging station that, within the same structure, combines energy capture, storage and supply for electric vehicles or for the grid. Each module has an oscillating, counterweighted photovoltaic roof supported by bolts resting on the apexes of three semi-elliptical arches that serve as pillars. The spans of the arches accommodate and protect the energy supply points, accumulators and counterweights that serve as stops for the angle of oscillation of the roof. The roof is fastened on three frames, which are counterweighted, capable of oscillating at the same time by means of linear actuators, enabling the roof to track east to west. Between rows of panels is a trough for protection and for water runoff, which leaves a hollow space for ventilation of the panels. Parking can be expanded by means of lining up modules, without changing the equal distance between the pillars.

4 Claims, 3 Drawing Sheets

(51) Int. Cl.
*F24J 2/46* (2006.01)
*F24J 2/52* (2006.01)
*F24J 2/54* (2006.01)
*E04H 6/02* (2006.01)
*B60L 11/18* (2006.01)
*H02S 20/00* (2014.01)
*H02S 20/32* (2014.01)
*H02S 20/10* (2014.01)

(52) U.S. Cl.
CPC ............ *E04H 6/025* (2013.01); *F24J 2/4621* (2013.01); *F24J 2/525* (2013.01); *F24J 2/5232* (2013.01); *F24J 2/541* (2013.01); *H02S 20/00* (2013.01); *H02S 20/10* (2014.12); *H02S 20/32* (2014.12); *B60L 2200/12* (2013.01); *B60L 2230/16* (2013.01); *B60L 2230/22* (2013.01); *B60L 2230/30* (2013.01); *F24J 2002/5493* (2013.01); *Y02E 10/47* (2013.01); *Y02E 10/50* (2013.01); *Y02T 10/7005* (2013.01); *Y02T 10/7094* (2013.01); *Y02T 90/121* (2013.01); *Y02T 90/128* (2013.01); *Y02T 90/14* (2013.01); *Y02T 90/163* (2013.01); *Y10T 307/25* (2015.04)

(56) References Cited

FOREIGN PATENT DOCUMENTS

| | | |
|---|---|---|
| EP | 2292877 | 3/2011 |
| FR | 2946073 | 12/2010 |
| WO | WO 2011080367 | 7/2011 |

\* cited by examiner

SOLAR PARKING MODULE WITH INTEGRATED EV CHARGING STATION

OBJECT OF THE INVENTION

Technical Field

The invention relates to a solar parking module with integrated EV (Electric Vehicle) charging station, offering several novelty advantages and characteristics, which will be described in detail further on and that represent a noticeable innovation in the state of the art.

More specifically, the object of the invention centres on a modular structure for car parks having an oscillating photovoltaic roof, which additionally incorporates at least one integrated EV charging station (a word extensively used to denote charging stations that dispense energy for charging the batteries of electric vehicles). Furthermore, the innovative design of the structure of said parking module also allows it to integrate elements for the capture, processing, storage and supply of energy to the electric vehicles at the same time as to fulfill its function of protecting parked vehicles, which are shaded from the sun and guarded from the rain.

BACKGROUND INFORMATION

Often, especially in the city, a vehicle spends more time parked, occupying space, than circulating. The present invention makes better use of space and time in such a way that both the city and users benefit from having more productive spaces that result in improving the real autonomy of the electric vehicle. At the same time, the grid is liberated from overloads occurring for this reason, by using renewable sources to satisfy the energy requirements of urban transport, thereby contributing to wider dissemination thereof, with a view to obtaining cleaner and more sustainable cities. The electric vehicle will be a solution for clean transport if the energy used for charging comes from clean and renewable energy sources.

The field of application of the present invention is within the technical sector of the industry that manufactures and installs EV charging stations or electricity supply connection points that dispense energy to charge the batteries of electric vehicles, while encompassing at the same time the sector of industry that manufactures and installs panels that capture solar energy and the one that manufactures structures for car parks, mainly the ones designed for use in the city context.

In general, to fully charge an electric vehicle requires in the region of 30-60 kWh, and takes approximately 6 hours to obtain 170 km of autonomy at a moderate speed (city).

As is known, the electric vehicle is already a fact, but it will only become a social reality if the problems associated to charging are solved in an optimum way. For the time being, there are three charging systems: Slow charge (6 h), Fast charge (45 minutes) and Battery replacement.

Numerous car manufacturers offer a wide range of choices. The benefits of the electric vehicle are many, especially with regard to urban transport. It does not consume when at a standstill, and does not pollute, locally, when it travels, with its major drawbacks being its autonomy, the lack of charging points and the time it takes to charge.

At the same time, the electric vehicle will only represent a clean transport solution, when the energy that is used for charging comes from clean energy sources.

On a separate note, city's power infrastructures are not prepared to withstand the increase in demand that this new use would entail.

It would be desirable for this increase in demand for energy to be satisfied by renewable sources through "in situ" generation systems that take advantage of cities' open spaces and the downtimes taken up by parking.

SUMMARY OF THE INVENTION

The present invention resolves this problem and it must be stated that on the part of the applicant there is no knowledge of the existence of any other invention that presents similar technical characteristics in terms of structure and layout to the ones presented by the solar parking module with integrated EV charging station disclosed herein, whose characterising details are duly set out in the claims at the end of this description of the invention.

Normally, the spaces used for car parks (entrances to large shopping centres, sports facilities, stations, airports, etc.,) have standard measurements. A parking place for a vehicle usually has dimensions of 2.3×5 m. Vehicles are parked side by side forming large clusters of rows facing each other with a width of 10 to 12 m. At the same time, the height of the roofs ranges from 2 to 2.5 m.

Between these clusters lanes measuring 6.5 metres wide are left for two-way vehicle transit, in such a way that they can enter and leave the car parking space without difficulty. The design of the parking module of the present invention proposes to take advantage of these infrastructures to convert them into roofs that capture solar energy, by using the arches that serve as supports as an element that integrates and protects the EV charging station that they incorporate.

The placement of the panels, to fulfill their function of capturing energy in an optimum manner, must be tilted based on their geographical location. This tilting causes shadows to be cast between rows, meaning that they must be separated to some extent in order to prevent the effects of losses due to shading. In the design of the disclosed parking module, these free spaces between rows are covered by a trough that collects water runoff and leads it to the ends of the roof. At the same time, this trough will prevent rays of sunlight from penetrating the area projected by the roof, leaving spaces free for air to circulate between the panels, improving heat dissipation and consequently their performance.

As explained previously, the energy demand resulting from charging processes is always high. By providing the roof with solar tracking, the losses due to shading mentioned above can be reduced, at the same time as maximising capture of the solar resource and making the most of the spaces.

What is important is to capture the highest amount of energy during the hours when solar radiation is at its greatest, and for this reason, the tilting of the panels is conditioned by the geographical location of the place, since the path of the sun varies accordingly.

The ideal orientation of the axis of the roof that forms the disclosed car park will be the N-S axis (North-South), and for tracking in the E-W direction (East-West) the roof has been provided with movement following this axis. This tracking is achieved thanks to the oscillation of the entire photovoltaic roof by means of two juxtaposed actuators or cylinders fastened to each pillar shaped like a semi-elliptical arch which serves as a support for the entire structure.

The span of the arch will accommodate the vehicle charging points, which will preferably combine fast and slow charging, in addition to all other elements required for processing the energy, while protecting them from the elements and from potential collision by any vehicle. The energy storage system (accumulators) is located in a pit of approximately 1.0 m3 integrated into the footings or foundations of the structure.

The concept of a semi-elliptical arch supported by its lower base allows height to be gained at its apex at the same time as providing great stability through being formed by two arches that converge towards the apex reinforced along their sides by means of transversally welded bars, and allowing two mopeds to be parked on either side, without interfering with the space required for vehicles to manoeuvre.

In the preferred design of the disclosed parking module, it will be possible to supply four cars around each pillar (two on either side) and two motorcycles, the latter facing the arch. The two middle parking spaces between the pillars will be used for parking cars that do not need to charge.

It is important to note that the parking structure of the invention has a counterweighted roof, which is fundamental for improving safety against accidents due to imbalances caused by the roof's own weight or by the action of the wind, rain, snow, etc . . . The counterweight additionally carries out the functions of a mechanical stop, serving to block the oscillation of the roof by means of tension cables or locks in the event of adverse weather conditions.

In addition to the roof's E-W oscillation, each row of panels may be provided, optionally, with a second oscillation system that allows it to track the N-S axis, this way completing tracking on two axes.

The constructive shape and dimensions of the elements that comprise the car park assembly of the invention are modular, which allows their use to be adapted to multiple shapes of the terrain. The ideal distance between pillars coincides with the width of 3 double parking spaces, which represents distances of 8 metres, ideal for achieving on the one hand the space required for locating the vehicles and on the other hand the ease of manufacture, handling and transport, given that the lengths of all the construction elements do not exceed 12 m in length allowing for their transport in containers.

An ideal car park module according to the invention, has dimensions of 24×10=240 m2, and is made up of a rack consisting of parallel lines of bars 12 m in length, connected by one of their ends to a central frame and supported to the left and to the right on another two side frames, all of which are bolted to the apexes of three equidistant 8 m arches, which serve as pillars.

The concept of modularity makes extension possible in any way required, by merely adjoining standardised elements to the initial structure, given that the distance between pillars is equidistant.

From the point of view of the power grid, the incorporation of this car park not only entails a reduction in the efforts required from it, but also becomes a system that reinforces weak grids. The energy conversion and management systems allow for integration of the capture surface as a distributed generation element, with the possibility of delivering surplus power in a controlled manner, in other words, by delivering active and reactive power according to variable demand following the requirements established by the grid operator.

The invention achieves integration in a single construction unit of primary energy capture, its conversion into electricity, storage thereof to support sporadic demand and its supply to parked electric vehicles, leaving all its components protected by the structure itself in addition to protecting parked vehicles from the sun and the rain.

Therefore, the described solar parking module with integrated EV charging station represents an innovative solution with characteristics and functioning that was unknown for this purpose until now, which are reasons that added to its practical utility give it sufficient grounds for obtaining the exclusivity right applied for hereunder.

BRIEF DESCRIPTION OF THE DRAWINGS

To complement the description being made and in order to aid towards a better understanding of the characteristics of the invention, a set of plans is attached to the present description, as an integral part thereof, where with illustrative and non-limiting character, the following has been represented.

DETAILED DESCRIPTION OF THE PREFERRED EMBODIMENTS

In light of the figures mentioned, it is possible to observe in them an example of preferred embodiment of the invention, which comprises the parts and elements described in detail below, the numbering of which corresponds to the following:

1.—Solar roof.
2.—Photovoltaic panels.
3.—Rack.
4.—Frame.
5.—Central bolt.
6.—Counterweight.
7.—Linear actuator.
8.—Pillar.
9.—Reinforcement bar.
10.—Accumulators.
11.—Trough.
12.—Slow charging stand.
13.—Fast charging stand.

Figures 1, 2:
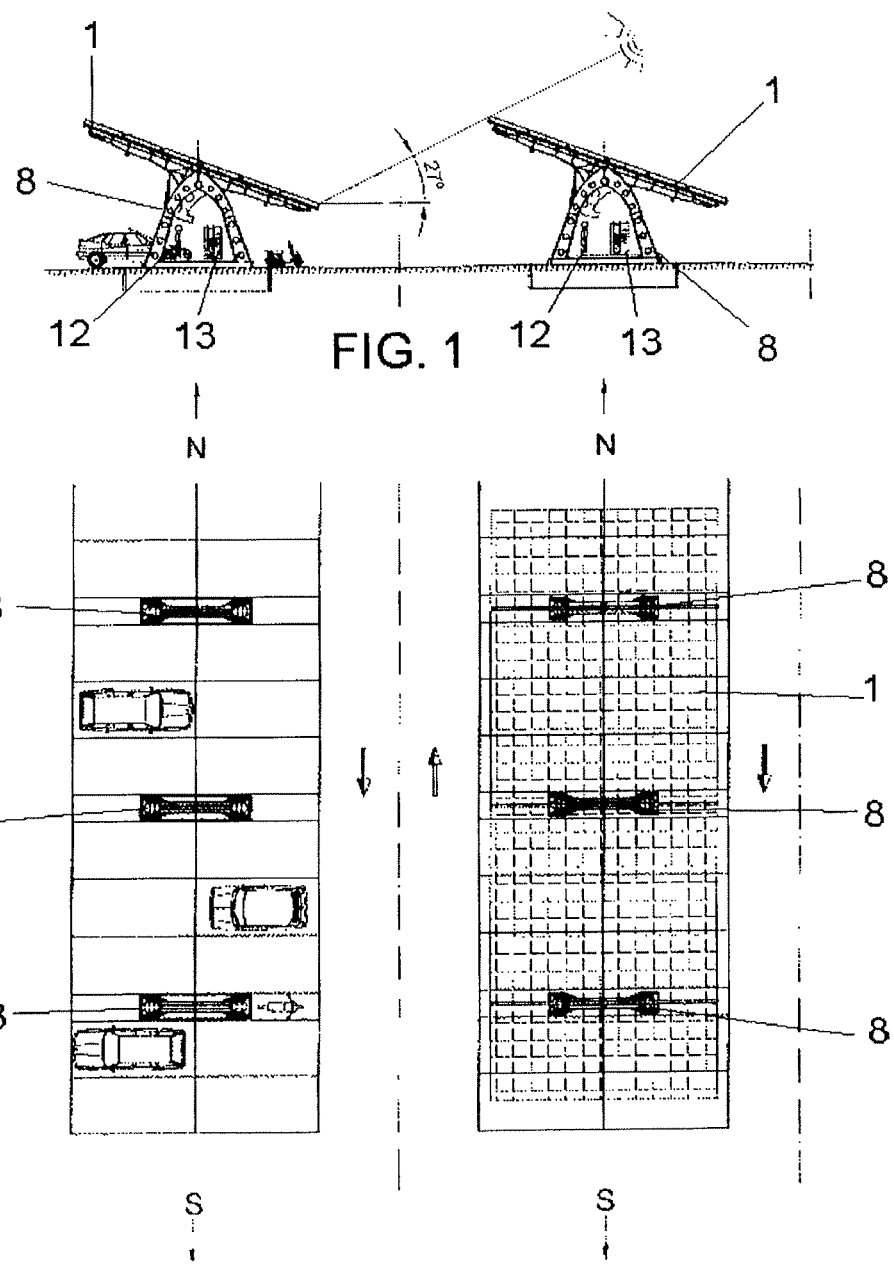
FIG. 1 is a side elevation view of two examples of the parking module according to the invention, wherein the arch configuration of the pillars can be seen and the mobile construction of the solar roof on them, represented in a titled position to capture the evening sun, as well as their layout separated by a lane for vehicle access.
FIG. 2 is a plan view of the two examples of the parking module according to the invention shown in the preceding figure, having represented in this case one of them with the roof and the other one without it to display the distribution of the spaces designed for vehicles around the pillars.
Figure 3:
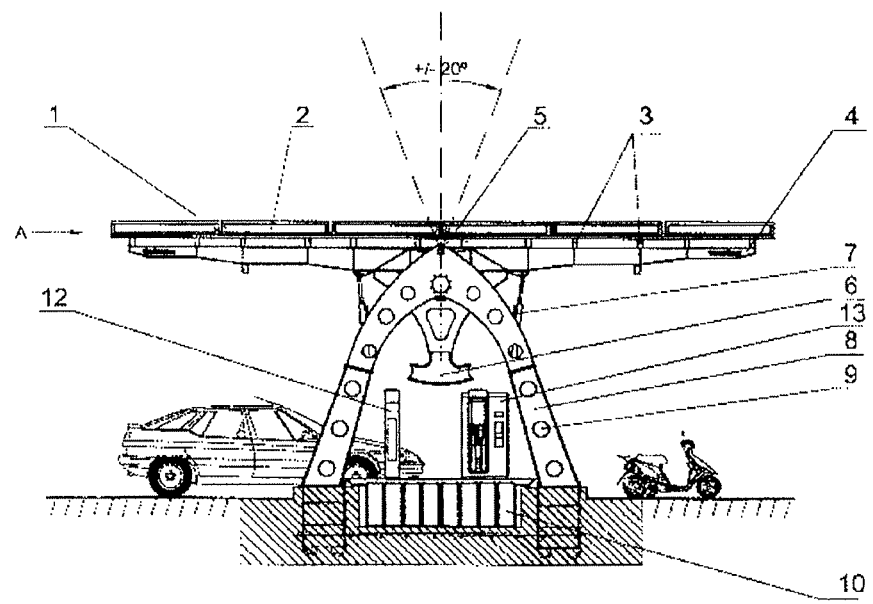
FIG. 3 is a side elevation view of an example of a solar parking module according to the invention, similar to the ones shown in the preceding figures, in this case represented in the position at noon, where it is possible to appreciate in greater detail the main parts and components that it comprises.
Figure 4:
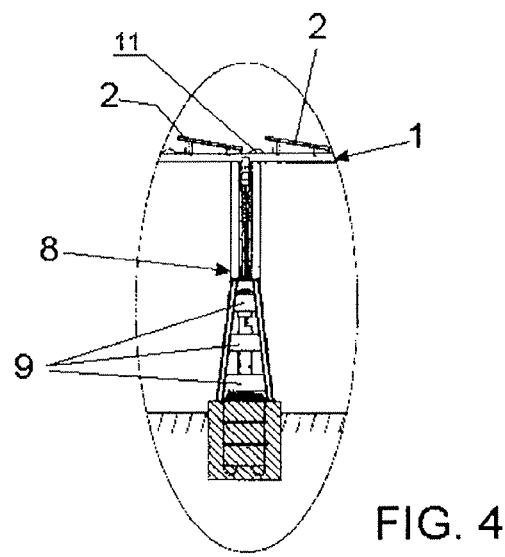
FIG. 4 is a front detail of the example of the parking module according to the invention shown in FIG. 3, represented from perspective A indicated in said FIG. 3.

Thus, as shown in FIGS. 1 and 2, each parking module according to the invention, which in each case will be arranged following the N-S orientation that is appropriate according to the location, consists of a structure that has an oscillating or pivotable photovoltaic solar roof (1) supported by pillars (8), arranged so that there are several car parking spaces laid out between them and, at least, two spaces for motorcycles facing each other, one on each side of said pillars.

The solar roof (1), on which the photovoltaic panels (2) are secured grouped together in rows, consists of a rack (3) of bars having a rectangular section, which are disposed connected by one of their ends to a central frame (4) of the three which preferably, each module contemplates, and which are distributed in an equidistant manner below the roof.

The assembly is mounted on said frames (4) which, having a variable configuration, are provided with a counterweight (6) which, in the manner of a sailing boat's centreboard, and solid with the frame, stabilises the oscillating roof (1).

Said frames (4), for their part, are in turn supported by three pillars (8) that serve to support the structure.

It is important to note that each one of the pillars (8) is made up of respective semi-elliptical arches joined to each other by means of reinforcement bars (9) lodged transversally between them, two of them disposed at the same height serving as mechanical stops for the angle of oscillation of the roof (1) when the counterweight (6) comes into contact with them.

Furthermore, at the apex of the aforesaid semi-elliptical arches formed by the pillars (8), a central bolt (5) is incorporated, which acts as an articulated joint between the frame (4) and the pillar (8), with a linear actuator (7) having also been contemplated juxtaposed in respect of said central bolt (5) which oscillates the solar roof (1) in a controlled manner causing it to be focused at the sun.

Figure 5:
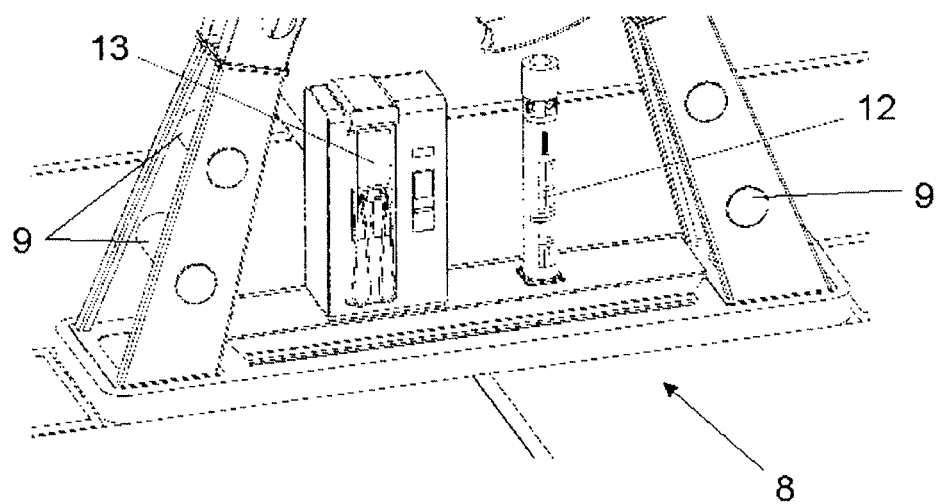
FIG. 5 is a perspective view of a detail of the EV charging station that incorporates the module of the invention, showing two different charging points that are incorporated fastened to one of its support pillars.

For its part, each pillar (8) incorporates in its bottom part, as shown in FIG. 5, an EV charging station consisting of two charging stands, one for slow charging (12) and one for fast charging (13) with capacity for four charging points. These charging points (12 and 13) include a prepay system, energy meter, command and protection switches, and a communications port.

Below the level of the ground and integrated into the foundation works a pit has been contemplated to accommodate several accumulators (10) which will be charged by the solar energy obtained through the photovoltaic panels (2) of the roof (1) during downtimes and/or, in the case of high demand, by the grid itself, preferably during night hours.

In a preferred embodiment, the solar roof (1) of each car park module has dimensions of 24×10 m and is formed, by 24 parallel bars of 12 m in length connected to the central frame (4) to which they are fastened by means of struts forming the rack (3) where the panels (2) are mounted in rows, tilting according to the location's latitude. A space will be left between said rows to prevent shading between panels (2) and to favour heat dissipation. In these spaces between rows, troughs (11) will be installed in the shape of a W that serve to provide shading and to channel run-off water.

To the aforesaid rack (3) 108 photovoltaic panels (2) are secured distributed in 6 rows of 18 units, preferably panels of the Sunpower E19/318 type of 318 W/panel, with a total installed power rating of 34.5 kW.

In the aforesaid example of a preferred embodiment, the pit in the foundations for the accumulators (10) will be approximately 2.5×0.6×0.66=1.0 m3 for accommodating an energy store with 15 accumulators (10) with a capacity of, at least 87 kWh of useful energy to discharge in 6 hours.

If the location of this preferred embodiment were Seville and discounting total losses due to temperature, reflection, dirt and adding gain from solar tracking, 2070 equivalent hours would be obtained with an annual production of 34.3×2070=71,001 kWh/year, which would represented 71,001/60=1,183 full charges equivalent to a saving of 12.1 Tm of avoided CO2.

When there was no demand to charge vehicles the surplus energy would be discharged and billed to the grid.

With regard to the installation system of the proposed parking module it would be mounted, in a first phase, on 6 props supported on and leveled above ground at a height that would allow, in a first instance, mounting the three counterweights (6) on each one of the frames (4), leaving these perfectly aligned and leveled. Next, the 24 bars (3) of 12 m would be mounted by means of struts, connecting them to the central frame (4). At the bottom part, the three frames (4) would be reinforced by means of four bars (3) of 8 m, matching on the central frame, leaving the rack complete.

The next step would be to proceed with the assembly and subsequent connection of the 108 photovoltaic panels (2). Once the assembly had been mounted, the solar roof (1) would be erected by means of cranes, for securing using the central bolts (5) above the three semi-elliptical arches of the pillars (8), next proceeding, without releasing the crane's slings, to fasten the 3+3=6 linear actuators (7) leaving the solar roof (1) perfectly fastened to the arches that form the support pillars (8).

Next, the oscillation of the solar roof (1) would be checked in the E-W direction verifying that the angles are as contemplated and that the counterweight (6) remains barely a few millimetres away from the stops formed by the bars (9) that reinforce and brace the two arches of each pillar (8). At the same time, the correct functioning of the mechanical blocking systems for the counterweight would be checked.

Subsequently, the EV charging station would be completely connected checking each parameter to be controlled and putting it into service.

By way of a summary therefore, the parking module of the invention, being of the type made up of a structure having a roof supported on pillars (8) that fulfills the function of protecting the vehicles parked below it so that they are kept shaded and guarded from the rain, stands out for the fact that it comprises, combined in the same structure, means for capturing, processing, storing and supplying electrical energy to the parked vehicles or to the grid, having for this purpose a solar roof (1), with photovoltaic panels (2) grouped into rows, counterweighted and provided with solar tracking on its E-W axis, through the action of two linear actuators (7) juxtaposed in respect of central bolts (5) that secure the apexes of three semi-elliptical arches in the form of pillars (8), whose spans serve to safeguard charging points (12 and 13), at the same time being provided with counterweights (6) and with a system of energy accumulators (10), situated below the level of the ground, in a pit integrated into the foundation works.

Having sufficiently described the nature of the present invention, as well as the way of putting it into practice, it is not considered necessary to give greater explanation so that any person skilled in the art can understand its scope and the advantages derived from it, placing on record that, within its essential nature, it can be put into practice in other forms of embodiment that differ in details from that indicated by way of example, and to which protection claimed shall also be given, provided that its main principle is not altered, changed or modified.

Modifications and substitutions by one of ordinary skill in the art are considered to be within the scope of the present invention, which is not to be limited except by the allowed claims and their legal equivalents.

The invention claimed is:

1. A solar parking module with integrated Electric Vehicle charging station comprising a structure with a roof supported on pillars (8) that fulfils the function of protecting vehicles parked beneath it so that they are shaded and guarded from the rain, the module characterised in that it comprises, combined in the same structure, means for capturing, processing, storing and supplying electrical energy to parked vehicles or to the grid, being provided with a solar roof (1), with photovoltaic panels (2) grouped into rows, counterweighted and provided with solar tracking on its E-W axis, by means of the action of linear actuators (7) juxtaposed in respect of central bolts (5) which secure it to the apexes of three semi-elliptical arches that serve as pillars (8), whose spans serve to safeguard the charging points (12 and 13), likewise being provided with counterweights (6) and with a system of energy accumulators (10), situated below ground level, in the pit integrated in the foundations.

2. The solar parking module with integrated Electric Vehicle charging station, according to claim 1, characterised in that the solar roof (1) is formed by a rack (3) of bars with a rectangular section, which are disposed on frames (4) provided with a counterweight (6), which, in the manner of a sailing boat centreboard, and solid with the frame, stabilises the oscillating solar roof (1).

3. The solar parking module with integrated Electric Vehicle charging station according to claim 1, characterised in that each one of the pillars (8) is formed by respective semi-elliptical arches jointed to each other by bracing bars (9) lodged transversally between them, two of them disposed at the same height serving as mechanical stops for the angle of oscillation of the solar roof (1) when the counterweight (6) comes into contact with them.

4. The solar parking module with integrated Electric Vehicle charging station, according to claim 1, characterised in that between the rows of photovoltaic panels, troughs (11) are placed in the shape of a W, which serve to shade and channel water run-off.

* * * * *